UNITED STATES PATENT OFFICE.

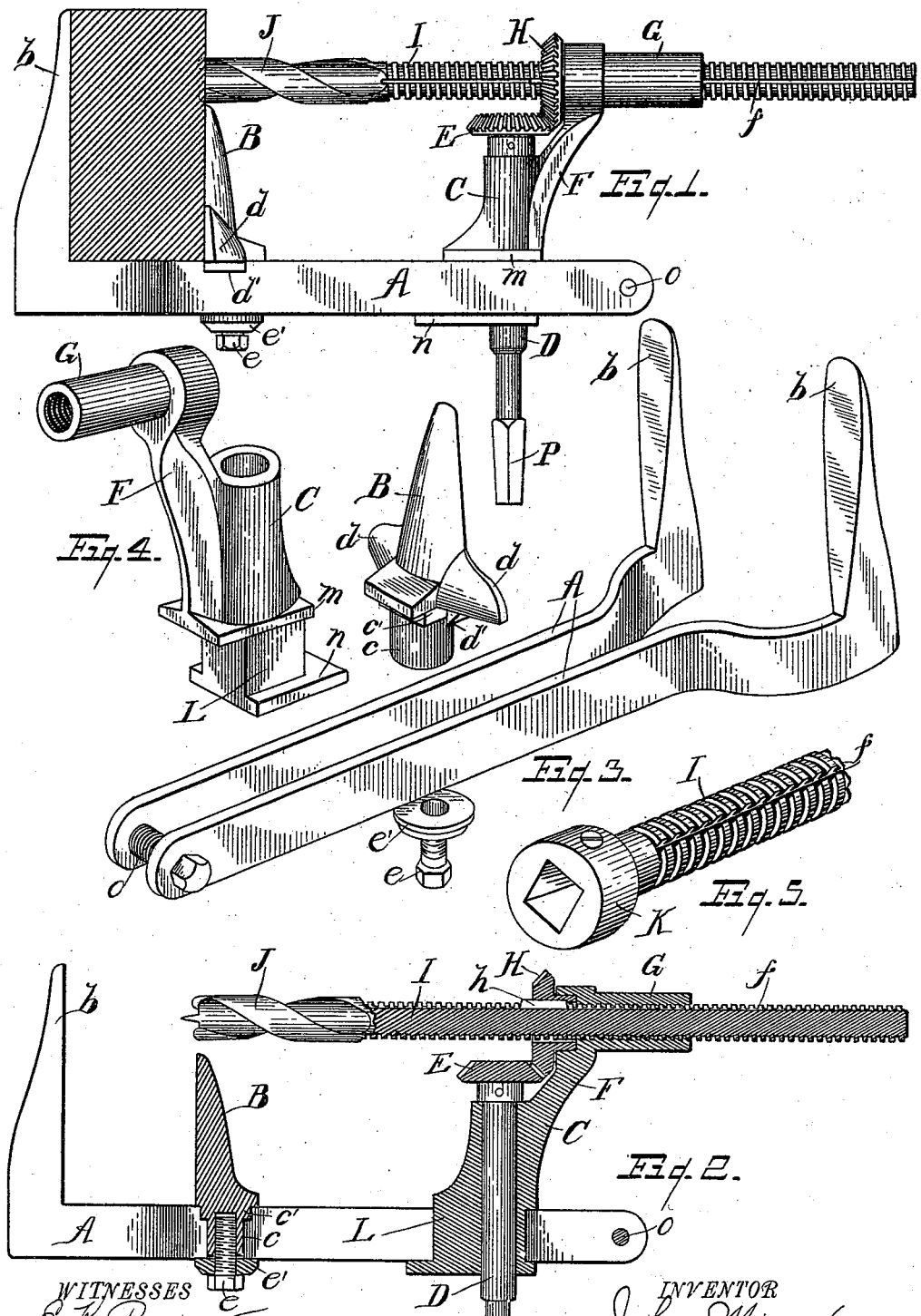

JOHN MINER, OF DETROIT, MICHIGAN.

BORING-MACHINE.

SPECIFICATION forming part of Letters Patent No. 518,195, dated April 10, 1894.

Application filed April 17, 1893. Serial No. 470,602. (No model.)

*To all whom it may concern:*

Be it known that I, JOHN MINER, a citizen of the United States, residing at Detroit, in the county of Wayne, State of Michigan, have invented certain new and useful Improvements in Boring-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in boring and drilling machines, especially designed for the boring of overhead joist for electric wiring, and consists in the construction and arrangement of parts as fully hereinafter set forth, the essential features of which being pointed out particularly in the claims.

The object of the invention is to produce a simple, cheap and effective boring machine, adapted to a variety of work of this class, but especially applicable for the boring of horizontal holes through a series of joists in a building, from below said joists, for the purpose of stringing electric wires and for other purposes when holes are required in places of difficult access and where the ordinary brace could not be used. This object is attained by the mechanism illustrated in the accompanying drawings, in which—

Figure 1 is a side elevation of this improved machine showing it in position as when boring a joist, which appears sectional. Fig. 2 is a central longitudinal section, the bit appearing in elevation. Fig. 3 is an enlarged perspective of the bed and integral jaws, showing movable jaw detached. Fig. 4 is a perspective of the adjustable head which carries the shaft and spindle. Fig. 5 is a perspective of the spindle provided with a set screw chuck.

Referring to the letters of reference, A designates the parallel bars forming the bed, said bars being curved outward at their outer ends and provided with the right angle bearing jaws $b$, formed integral therewith. B designates the movable jaw which is mounted upon the bed with its stem $c$ depending between said bars A, which embrace the rectangular portion $c'$ thereof. The stem of said jaw is tapped to receive the screw bolt $e$ which binds the washer $e'$ against the under edge of the bars A and secures said jaw when set. Extending from the sides of said jaw are the wings $d$, which increase the bearing surface thereof and from which depend the lugs $d'$ on each side, said lugs embrace the outer face of said bars and prevent their spreading. This jaw is set opposite the jaws $b$, and is adapted to be adjusted with respect to said jaws, by means of the screw bolt $e$, so as to confine the article to be bored, as shown in Fig. 1.

C designates a head in which the drive shaft D is journaled, said shaft carrying a beveled gear E at its upper end. Extending from said head is a bracket F, which supports a sleeve G at right angles to said drive shaft. Journaled in the end of said sleeve is a beveled gear H that meshes with the gear E, by means of which it is driven. Said gear H is provided with a central aperture therethrough that registers with the aperture through said sleeve, which latter aperture is tapped or threaded, as shown in Figs. 2 and 4.

I designates the spindle, which is provided at one end with the bit J, and is threaded for its entire length and adapted to screw into the sleeve G, and pass freely through the gear H. Extending the entire length of the threaded portion of the spindle, is a keyway $f$ adapted to receive a key $h$, see Fig. 2, fixed in the gear H. By which construction the revolution of said gear will transmit its motion to said spindle, and at the same time permit the spindle to travel longitudinally through said gear, through the medium of the threaded sleeve G, in which it works. Whereby the bit is simultaneously revolved and driven longitudinally to properly feed it ahead as the hole is bored. A reversal of the motion of said gear will run the spindle back and with-draw the bit, as will be well understood.

The head C is provided with the rectangular base L, which is embraced by the bars A, the upper and lower flanges $m$ and $n$ of said base projecting over the edges of said bars to to retain said head in place. Said head being securely clamped between said bars by means of the screw bolt $o$ passing through the bars at their ends, whereby they may be drawn together upon the base of said head, to securely anchor it when adjusted to the proper position. This manner of mounting said bearing head between the bars of the base enables said head to be readily adjusted to bring it near to the work, or to move it to any point within the limits of said bed, according to the character of the work being done. In employing the device for boring joist, a brace is usually employed in connection with a long rod or an extensible stem having a chuck adapted to receive the square shank P of the shaft D, whereby the boring of the joist may be easily and rapidly accomplished from the floor below.

To adapt the device for boring various sizes of holes, the spindle I may be provided with a set-screw chuck K, as shown in Fig. 5, which enables the employment of any sized bit desired.

This device may also be made to drive two or more spindles, by employing an idle wheel that will mesh with the gear E, and with the gears H of the respective spindles, whereby two or more holes may be bored or drilled instead of one.

Having thus fully set forth my invention, what I claim as new, and desire to secure by Letters Patent, is—

1. In a boring machine, the combination with a suitable base, of the longitudinally movable head mounted thereon, the drive shaft carrying a gear wheel journaled in said head, the sleeve mounted on said head and supported at an angle to said shaft and provided with internal threads, the gear wheel journaled in said sleeve and meshing with the drive gear, the threaded spindle passing through the sleeve and gear journaled therein, which latter is splined thereon said spindle carrying a bit or drill.

2. In a boring-machine, the combination of the approximately parallel bars having the integral jaws at their outer ends, the movable jaw mounted between said bars, the longitudinally movable head also mounted between said bars and supporting the internally threaded sleeve, the vertical shaft journaled in said head and having a beveled gear at its upper end, the threaded bit spindle passing through said sleeve at right angles to said shaft, the beveled gear journaled in the end of said sleeve and splined upon the bit spindle which passes therethrough, said gear meshing with the gear on said shaft.

In testimony whereof I affix my signature in presence of two witnesses.

JOHN MINER.

Witnesses:
E. K. ROEMER,
E. S. WHEELER.